United States Patent
Kuku

(10) Patent No.: US 9,616,374 B2
(45) Date of Patent: Apr. 11, 2017

(54) MULTI-STAGE TEMPERATURE BASED SEPARATION OF GAS IMPURITIES

(71) Applicant: Lai O. Kuku, Gilbert, AZ (US)

(72) Inventor: Lai O. Kuku, Gilbert, AZ (US)

(73) Assignee: MILLENIUM SYNTHFUELS CORPORATION, Gilbert, AZ (US)

(*) Notice: Subject to any disclaimer, the term of this patent is extended or adjusted under 35 U.S.C. 154(b) by 245 days.

(21) Appl. No.: 14/568,039

(22) Filed: Dec. 11, 2014

(65) Prior Publication Data

US 2015/0168055 A1   Jun. 18, 2015

Related U.S. Application Data

(60) Provisional application No. 61/916,138, filed on Dec. 14, 2013.

(51) Int. Cl.
| | | |
|---|---|---|
| *B01D 47/00* | (2006.01) | |
| *B01D 53/00* | (2006.01) | |
| B01D 53/14 | (2006.01) | |
| B01D 53/75 | (2006.01) | |

(52) U.S. Cl.
CPC ........ *B01D 53/002* (2013.01); *B01D 53/1487* (2013.01); *B01D 53/75* (2013.01); *B01D 2252/2021* (2013.01); *B01D 2257/2045* (2013.01); *B01D 2257/302* (2013.01); *B01D 2257/304* (2013.01); *B01D 2257/308* (2013.01); *B01D 2257/404* (2013.01); *B01D 2257/504* (2013.01); *B01D 2257/7025* (2013.01); *B01D 2257/80* (2013.01); *B01D 2258/02* (2013.01); *B01D 2258/0283* (2013.01); *Y02C 20/20* (2013.01)

(58) Field of Classification Search
CPC .................................................... B01D 53/002
USPC .............. 423/212, 242, 243.12, 24.351, 462; 95/143, 158, 228
See application file for complete search history.

(56) References Cited

U.S. PATENT DOCUMENTS

| | | | | |
|---|---|---|---|---|
| 8,623,307 | B2* | 1/2014 | Koss ................... | B01D 53/1425 423/220 |
| 9,399,192 | B2* | 7/2016 | Fujimoto ........... | B01D 53/1425 |
| 2013/0059185 | A1* | 3/2013 | Whitacre ............ | H01M 2/1077 429/99 |
| 2013/0205771 | A1* | 8/2013 | Zhang .................... | B01D 3/007 60/531 |
| 2014/0041523 | A1* | 2/2014 | Tsujiuchi ............... | B01D 53/62 96/218 |

(Continued)

*Primary Examiner* — Nina Bhat

(57) ABSTRACT

A process is provided for the removal of impurities from the exhaust gases being emitted from a power generation plant. A multi-stage temperature based separation system is being utilized. The removal of undesirable compounds/elements is accomplished by directing the exhaust gases from the power plant through a first stage cooling unit to lower the temperature of the exhaust gases to a first predetermined level that is below the boiling point of one or more of the undesired compounds/elements, diverting the resulting liquid to storage, directing the gas to a second stage cooling unit to further lower the temperature of the exhaust gases to a second predetermined level that is below the boiling point of several more of the undesired compounds/elements. The resulting exhaust gas is a very clean syngas that may be used in various commercial applications.

8 Claims, 2 Drawing Sheets

(56) References Cited

U.S. PATENT DOCUMENTS

2014/0076166 A1* 3/2014 Nakayama ......... B01D 53/1418
96/234

* cited by examiner

MULTI-STAGE TEMPERATURE BASED
SEPARATION OF GAS IMPURITIES

TECHNICAL FIELD

The subject design relates generally to a process of separating impurities from exhaust gases being emitted from a power plant and more specifically relates to a process of using a temperature based system to separate the impurities from the exhaust gases.

BACKGROUND

A common problem with power plant exhaust gas processing is dealing with emissions and impurities. Most industries find that dealing with this problem is very costly as well as complex. An example would be coal fired plants and their emission of sulfur dioxide ($SO_2$), nitrogen oxides ($NO_2$), carbon dioxide ($CO_2$) and other potentially harmful gases. Due to the high cost of cleaning up their missions, many coal fired plants choose to shut down. Likewise, even when using plasma fired plants, gases, such as, hydrogen chloride (HCl), carbon dioxide ($CO_2$), hydrogen sulfide ($H_2S$), and carbonyl sulfide (COS) need to be removed in order to produce a more clean synthesis gas (syngas). There have been many different arrangements that attempt to remove detrimental exhaust gas compositions but most of them are only partially effective in removing most if not all of the detrimental exhaust gas compositions. This many times is based on the extreme costs of effective types of exhaust gas clean-up systems. The subject design serves as a possible solution to at least the removal of the above noted detrimental exhaust gases.

SUMMARY OF THE INVENTION

According to the present design, a process for clean-up of emitted gases from various types of power plants is provided. The subject process includes various operational steps. The steps generally include directing the gases from a power plant to a first stage cooling unit wherein the temperature of the gases is lowered to a predetermined level resulting in some components of the gases converting to their liquid state since the temperature within the first stage cooling unit is below their respective boiling points. Following the first stage cooling step, the solution of gas and liquid is pumped from the first stage cooling unit into a first gas-liquid separator. The liquid is directed to a first storage unit and the gas is directed to a second stage cooling unit wherein the temperature therein is at a much lower level resulting in other components in the gas converting to their liquid state since the temperature within the second stage cooling unit is below their respective boiling points. Following the second stage cooling step, the solution of gas and liquid is pumped from the second stage cooling unit into a second gas-liquid separator. The liquid within the second gas-liquid separator is directed to a second storage unit and the cleaned gas is directed downstream for use in known commercial applications.

Other objects, features, and advantages of the subject concept will become more apparent from the following detailed description of the preferred embodiment and certain modifications thereof when taken together with the accompanying drawings.

DETAILED DESCRIPTION

Figure 1:
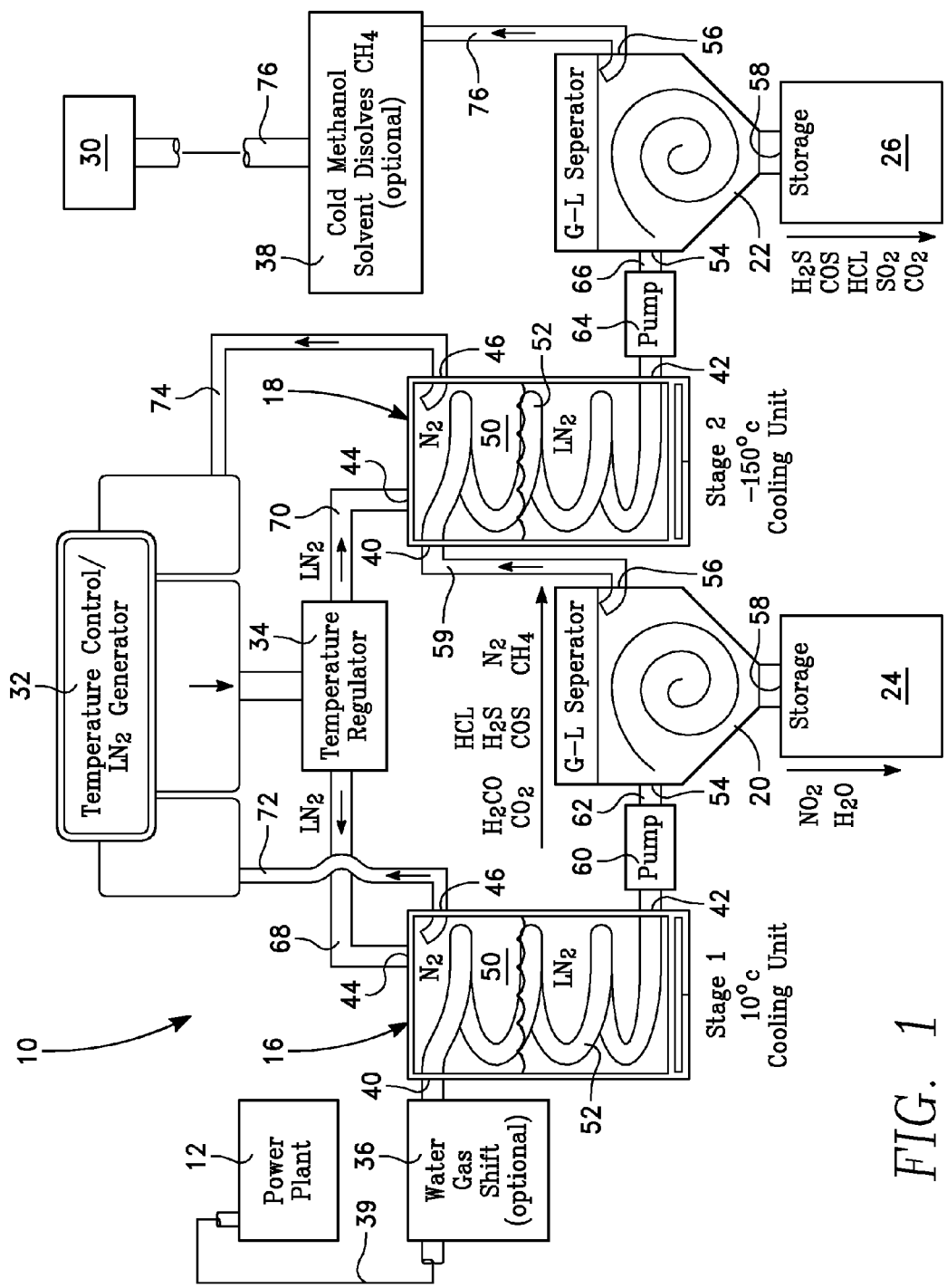
FIG. 1 diagrammatically illustrates a process flow and system diagram of an aspect of the subject invention.

Referring to FIG. 1 of the drawings, a power generating system 10 is disclosed. The power generating system 10 includes a power plant 12, a first stage cooling unit 16, a second stage cooling unit 18, a first gas-liquid separator 20, a second gas-liquid separator 22, first and second liquid storage units 24,26, and a downstream commercial application 30. The power generating system 10 also includes a temperature controlled liquid nitrogen generator 32, and a temperature regulator 34 operative to control the respective temperatures within the first and second stage cooling units 16,18. An optional water gas shift arrangement 36 may be disposed between the power plant 12 and the first stage cooling unit 16. Likewise, an optional cold methanol solvent solution 38 may be disposed between the second gas-liquid separator and the downstream commercial application 30.

The power plant 12 may be a plasma fired power plant that generally emits syngas that has some unwanted impurities therein, such as, for example, hydrogen chloride (HCl), carbon dioxide ($CO_2$), hydrogen sulfide ($H_2S$), and carbonyl sulfide (COS) as well as other impurities. Additionally, other gases, such as, hydrogen ($H_2$), carbon monoxide (CO), methane ($CH_4$), and nitrogen ($N_2$), are in the syngas coming from the plasma power plant. Additionally, the power plant 12 may be a fossil fuel fired power plant that generally emits some potentially harmful gases, such as, for example, nitric oxides ($NO_x/NO_2$), sulfur oxides ($SO_x/SO_2$), and carbon dioxides ($CO_2$). Some of these harmful gases may require known wet and dry scrubbers within the power plant as well as known absorbers in order to aid in the removal of these gases. Furthermore, in order to aid in the proportional relationship between the hydrogen and the carbon monoxide in the exhaust gases, the water gas shift arrangement 36 is added in a conduit 39 that connects the power plant 12 to the first stage cooling unit 16. Whether, the power plant 12 is fired by plasma torches or fossil fuels, the subject cleaning system is useful in removing many undesirable gases from the exhaust gases of the power plant 12.

The first and second stage cooling units 16,18 are substantially the same and only the first stage cooling unit 16 will be discussed in detail. Like elements have like element numbers. The first stage cooling unit 16 has a first inlet port 40, a first outlet port 42, a second inlet port 44, a second outlet port 46 and defines a cavity 50 therein. A spiral tube 52 is disposed within the cavity 50 and interconnects the first inlet port 40 and the first outlet port 42. Even though the spiral tube 52 is shown and described as a spiral tube, it is recognized that the shape of the tube 52 could be changed without departing from the essence of the subject invention.

The first and second gas-liquid separators 24,26 are substantially the same and only the first gas-liquid separator 24 will be discussed in detail. Like elements have like element numbers. The first gas-liquid separator 24 has an inlet port 54, an outlet port 56 and a discharge port 58. A conduit 59 is connected between the outlet port 56 of the first gas-liquid separator 20 and the first inlet of the second stage cooling unit 18. A first pump 60 is disposed in a conduit 62 that is connected between the first outlet port 42 of the first stage cooling unit 16 and the inlet port 54 of the first gas-liquid separator 20. A second pump 62 is disposed in a conduit 64 that is connected between the first outlet port 42 of the second stage cooling unit 18 and the inlet port 54 of the second gas-liquid separator 22. The first liquid storage unit 24 is connected to the outlet port 58 of the first gas-liquid separator 20 and the second liquid storage unit 26 is connected to the second gas-liquid separator 22.

The liquid nitrogen generator 32 is operatively connected to the temperature regulator 34. The temperature regulator 34 is operative to control the temperature of the liquid nitrogen being delivered therefrom. A first liquid conduit 68 is connected between the temperature regulator 34 and the second inlet port 44 of the first stage cooling unit 16 and delivers liquid nitrogen, at a first predetermined temperature level, from the temperature regulator 34 to the cavity 50 of the first stage cooling unit 16. A second liquid conduit 70 is connected between the temperature regulator 34 and the second inlet port 44 of the second stage cooling unit 18 and delivers liquid nitrogen, at a second predetermined temperature level, from the temperature regulator to the cavity 50 of the second stage cooling unit 18. A first gas return conduit 72 is connected between the second outlet port 46 of the first stage cooling unit 16 and the liquid nitrogen generator 32 and operative to return nitrogen gas from the cavity 50 of the first stage cooling unit 16 to the liquid nitrogen generator 32. A second gas return conduit 74 is connected between the second outlet port 46 of the second stage cooling unit 18 and the liquid nitrogen generator 32 and operative to return nitrogen gas from the cavity 50 of the second stage cooling unit 18 to the liquid nitrogen generator 32.

A conduit 74 is connected between the outlet port 56 of the second gas-liquid separator 22 and the downstream commercial application 30. As needed, the cold methanol solvent solution 38 may be disposed in the conduit 74.

A simulation of the process was performed using Aspen HYSYS. The assumptions made were that no reaction occurs within the apparatus which would induce endothermic or exothermic tendencies within the gas and that the separation is based solely on the differences in boiling points. The results were as expected where the first stage, at about 10 degrees Celsius (C.), resulted in the removal of liquid water and liquid nitrogen oxide. Likewise, in the second stage, at about −150 C., removal of liquid carbon dioxide ($CO_2$), liquid hydrogen sulfide (H,S), liquid carbonyl sulfide (COS), liquid hydrochloric acid (HCl), and liquid sulfur dioxide ($SO_2$) were removed.

Figure 2:
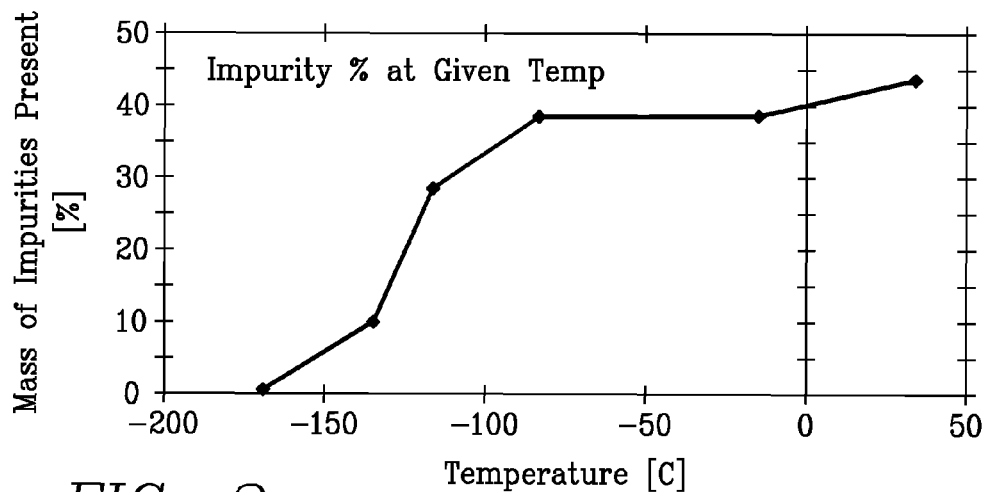
FIG. 2 graphically represents temperature verses a mass percent of impurities present.

Referring to FIG. 2, the graph disclosed therein has a horizontal scale representing temperature and a vertical scale representing the mass percent of impurities present. Depending on the boiling points of the various impurities, they convert from a gas to a liquid and the liquid can be removed.

Figure 3:
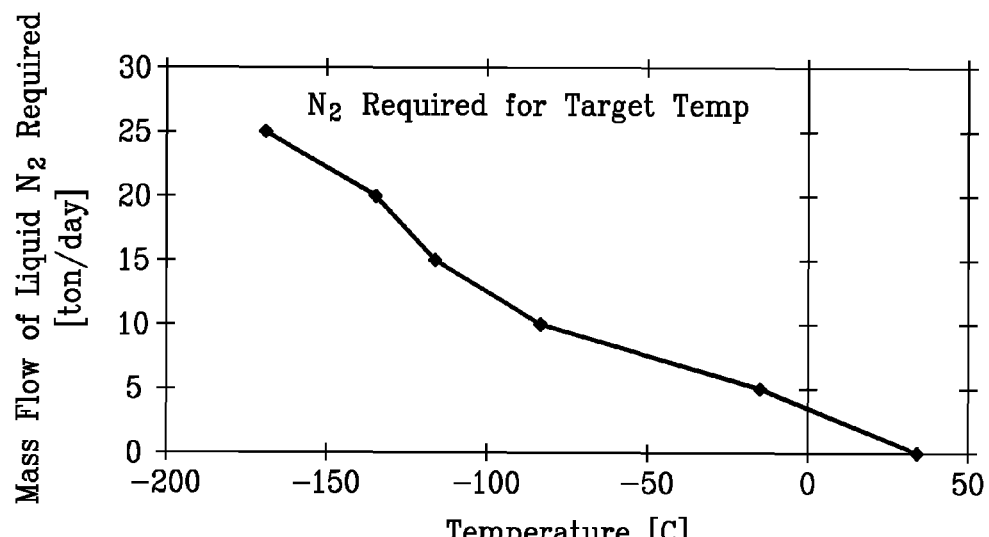
FIG. 3 graphically represents the liquid nitrogen ($LN_2$) required in the process system for various temperatures.

Referring to FIG. 3, the graph disclosed therein has a horizontal scale representing temperature and a vertical scale representing the mass flow (tons/day) of liquid nitrogen required to obtain the desired temperature. The simulation concluded that about 25 tons/day of liquid nitrogen would be needed in order to bring the temperature of a 15 ton/day syngas to the target temperature of −150 C. As set forth before, this temperature is where most of the impurities are converted to a liquid and removed. The result is a very clean syngas that can be utilized in various commercial processes.

INDUSTRIAL APPLICABILITY

The subject process for exhaust gas clean-up provides a simple, safe, and cost effective process to provide a clean syngas for use in various commercial applications.

During operation of the subject process, the exhaust gases from the power plant 12 is directed to the first stage cooling unit 16 and passes through the spiraled tube 52 disposed in the cavity 50 therein. Since the liquid nitrogen being directed into the cavity 50 is at about 10 degrees C., the temperature of the gases being directed through the spiraled tube 52 is lowered to about 10 degrees C. The level of the liquid nitrogen in the cavity 50 varies but is generally maintained at the midpoint as illustrated in FIG. 1. The portion of the liquid nitrogen that converts back to a gas is returned to the liquid gas generator 32 through the first return gas conduit 72 to be used to produce more liquid nitrogen.

The solution of liquids and gases are withdrawn from the first outlet 42 by the first pump 60 and delivered to the first gas-liquid separator 20. Within the first gas-liquid separator 20, the separated liquids are diverted to the first storage unit 24 and the separated gases are passed through conduit 59 to the first inlet port 40 of the second stage cooling unit 18.

Within the second stage cooling unit 18, the gases from the first inlet port 40 thereof are directed through the spiral tube 52 to the first outlet port 42 thereof. Since the liquid nitrogen being directed into the cavity 50 is about −150 degrees C., the temperature of the gases being directed through the spiraled tube 52 is lowered to about −150 degrees C. The portion of the liquid nitrogen within the cavity 50 of the second stage cooling unit 18 that converts back to a gas is returned to the liquid gas generator 32 through the second return gas conduit 74 to be used to produce more liquid nitrogen.

The solution of liquids and gases are withdrawn from the first outlet 42 of the second stage cooling unit 18 by the second pump 64 and delivered to the second gas-liquid separator 22. Within the second gas-liquid separator 22, the separated liquids are diverted to the second storage unit 26 and the separated gases are passed through the conduit 76 to the downstream commercial application(s) 30.

It may be desirable to utilize the cold methanol solvent solution 38 in the conduit 76 to dissolve any methane ($CH_4$) contained therein.

The liquids contained in the respective first and second storage units 24/26 may be further separated and commercially used in other commercial applications as desired.

The subject process for the clean-up of exhaust gases provides a simple, safe, and cost effective process for removing detrimental compounds/elements from the gases being emitted from a power plant.

Other embodiments as well as certain variations and modifications of the embodiment herein shown and described will obviously occur to those skilled in the art upon becoming familiar with the underlying concept. It is to be understood, therefore, that the subject design, as claimed, may be practiced otherwise than as specifically set forth above.

What is claimed is:
1. A process for cleaning various emitted gases, including sulfur dioxide, nitrogen oxide, carbon dioxide, water vapor, hydrogen chloride, hydrogen sulfide, carbonyl sulfide, hydrogen, carbon monoxide, and nitrogen from various types of power plants, comprising the steps of:
   directing the gases from the power plant to a first stage cooling unit wherein the temperature of the gases therein is lowered to about 10 degrees C. wherein liquid nitrogen dioxide ($NO_2$) and water ($H_2O$) are converted to their liquid state;

pumping the combined gas and liquid solution from the first stage cooling unit to a first gas-liquid separator wherein the separated liquid therein may be drained to a storage unit;

directing the gases from the first gas-liquid separator to a second stage cooling unit wherein the temperature of the gases therein from the first gas-liquid separator is lowered to about −150 degrees C. wherein liquid hydrogen sulfide ($H_2S$), liquid carbonyl sulfide (COS), liquid hydrochloric acid (HCl), liquid sulfur dioxide ($SO_2$), and liquid carbon dioxide ($CO_2$) are converted to their liquid state;

pumping the combined gas and liquid solution from the second stage cooling unit to a second gas-liquid separator wherein the separated liquid therein may be drained to a second storage unit; and directing the cleaned gases from the second gas-liquid separator on to be used for known commercial applications.

2. The process as set forth in claim 1 wherein the cleaned gases being directed from the second gas-liquid separator is composed essentially of carbon monoxide (CO), hydrogen ($H_2$), and inert nitrogen ($N_2$).

3. The process as set forth in claim 2 wherein the gases emitted from the various types of power plants further includes methane ($CH_4$).

4. The process as set forth in claim 1 including the step of providing a liquid nitrogen generator to produce liquid nitrogen and a temperature regulator to regulate the temperature of the liquid nitrogen;

supplying liquid nitrogen, at a temperature of 10 degrees C., from the temperature regulator to the first stage cooling unit to maintain a desired liquid level therein;

supplying liquid nitrogen, at a temperature of −150 degrees C., from the temperature regulator to the second stage cooling unit to maintain a desired liquid level therein; and withdrawing nitrogen ($N_2$) from within the first and second stage cooling units and directing the withdrawn nitrogen to the liquid nitrogen generator to aid in the production of more liquid nitrogen.

5. The process as set forth in claim 2 wherein the power plant is a plasma gasification that produces synthesis gas (syngas).

6. The process as set forth in claim 1 wherein the power plant is a fossil fuel fired power plant and the power plant has various scrubbers therein to remove additional impurities contained in the exhaust gases.

7. The process as set forth in claim 6 including adding the step of directing the gases from the power plant through a water gas shift to enrich the hydrogen ($H_2$) content within the gases prior to the gases entering the first stage cooling unit.

8. The process as set forth in claim 3 wherein the process includes adding a cold methanol solution downstream of the second gas-liquid separator and the cleaned gases from the second gas-liquid separator includes the step of directing the cleaned gases through the cold methanol solution to dissolve the methane ($CH_4$) contained therein.

* * * * *